United States Patent [19]

Currier et al.

[11] Patent Number: 5,771,205
[45] Date of Patent: Jun. 23, 1998

[54] BUOYANT TRANSDUCER ASSEMBLY FOR ASSISTING AN ANGLER

[75] Inventors: Jon David Currier; Kenton Sterling Jopling, both of Tulsa, Okla.

[73] Assignee: Lowrance Electronics, Inc., Tulsa, Okla.

[21] Appl. No.: 634,617

[22] Filed: Apr. 18, 1996

[51] Int. Cl.$^6$ ..................................................... G01S 15/96
[52] U.S. Cl. ........................... 367/107; 367/173; 367/910; 43/17.1; 441/133
[58] Field of Search ................................. 441/133, 131, 441/81, 136; 367/107, 910, 173; 43/17.1

[56] References Cited

U.S. PATENT DOCUMENTS

| | | | |
|---|---|---|---|
| 4,052,755 | 10/1977 | Baker | 441/133 |
| 4,639,903 | 1/1987 | Redolfi . | |
| 4,805,337 | 2/1989 | Kurata . | |
| 4,995,009 | 2/1991 | Altmire et al. . | |
| 5,088,068 | 2/1992 | Schaill et al. . | |
| 5,154,016 | 10/1992 | Fedora et al. . | |
| 5,201,884 | 4/1993 | Nicholas . | |
| 5,230,646 | 7/1993 | Thorup . | |
| 5,253,220 | 10/1993 | Wilson, Sr. . | |
| 5,463,597 | 10/1995 | Harlev . | |
| 5,483,767 | 1/1996 | Langer . | |
| 5,495,689 | 3/1996 | Cassem . | |
| 5,546,362 | 8/1996 | Baumann et al. | 367/173 |

*Primary Examiner*—Ian J. Lobo
*Attorney, Agent, or Firm*—Bell, Seltzer, Park & Gibson, P.A.

[57] ABSTRACT

A buoyant transducer assembly which may be attached to a fishing pole for providing signals indicative of objects, such as fish, within the water. The buoyant transducer assembly includes a sonar transducer supported by a float. The float has a central hub defining a downward opened recess for receiving the transducer and diametrically opposing buoyant cells for supporting the float upon the water. The float is positioned upon the water such that a predetermined portion of the float which has a surface area significantly larger than the surface area of the transducer contacts the water, thereby stabilizing the transducer and maintaining the transducer in a predetermined position relative to the body of water.

33 Claims, 4 Drawing Sheets

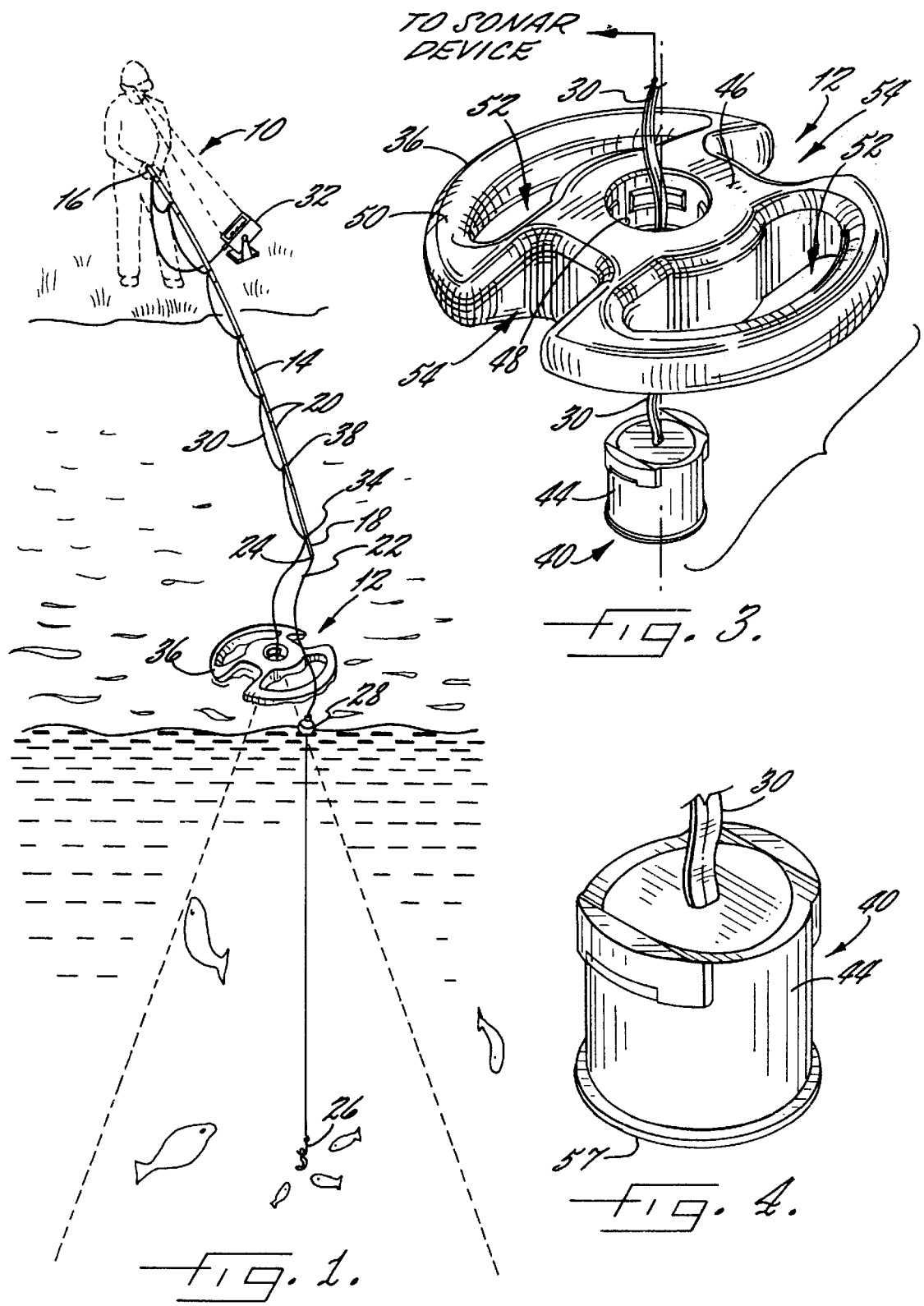

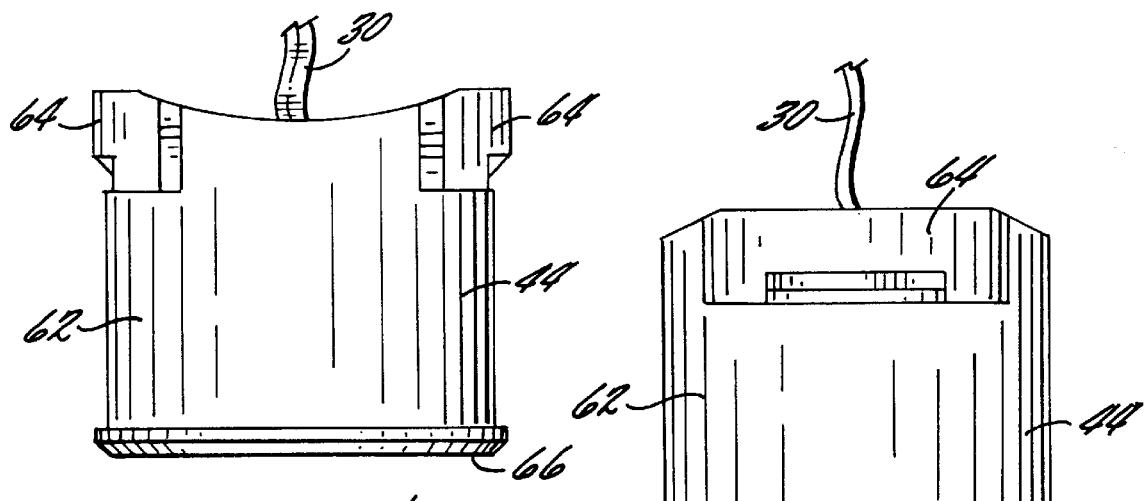
_fig. 5._
_fig. 6._
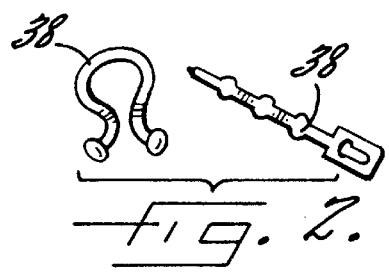
_fig. 2._
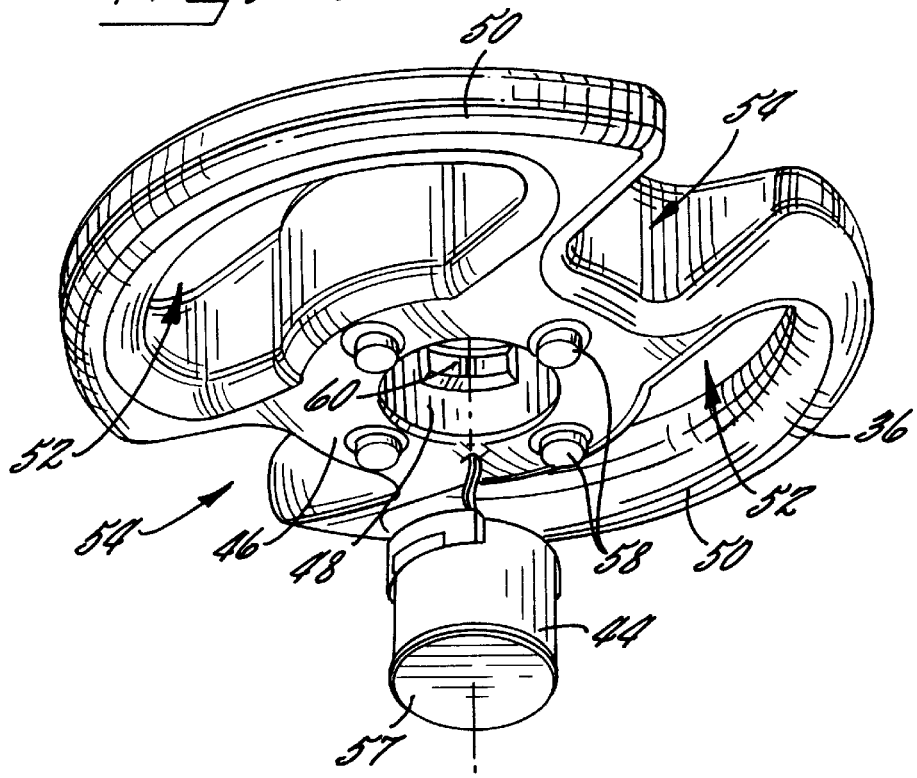
_fig. 7._

BUOYANT TRANSDUCER ASSEMBLY FOR ASSISTING AN ANGLER

FIELD OF THE INVENTION

The present invention is directed to a buoyant transducer assembly for assisting an angler and, more particularly, to a buoyant transducer assembly which includes a sonar transducer and a float, such as for use with a fishing pole in instances in which an angler is fishing from a bank, boat, dock, etc.

BACKGROUND OF THE INVENTION

Sonar technology finds many applications in the field of fishing by assisting in the location of optimum fishing sites based upon the depth of the water and the location of fish or other underwater obstacles. Sonar devices include a sonar transducer which transmits ultrasonic signals which travel outward from the transducer, such as in a downward direction, until striking the bottom of the body of water, a fish or other obstacles in the body of water. Upon striking the bottom of the body of water, a fish, or another obstacle, the ultrasonic signals are reflected, thereby creating echo signals which are received by the transducer. The sonar device can then convert the echo signals to electronic signals indicative of the contour of the bottom of the body of water as well as the relative location of other obstacles or fish within the water. The sonar device can also display a visual representation of these electronic signals, such as on a visual display.

Sonar devices are conventionally mounted on fishing boats and are powered by the boat's power source. These devices often include a sonar transducer which is often permanently mounted to the transom or hull of a boat. Accordingly, only fishing sites permitting boat navigation may be investigated with the sonar transducer, thereby limiting the applications in which these sonar devices can be employed. Such devices are also relatively expensive, particularly in instances where excessive licensing fees are imposed. Also, such devices are impractical in smaller bodies of water such as ponds and shallow rivers, when weather conditions render boat navigation hazardous, or when boating is prohibited. Indeed, such devices require access to a boat and a relatively large body of water to attain the full benefit of the sonar transducer's fish finding capabilities.

Sonar devices have been developed which are designed to locate fish in instances in which an angler is not positioned within a boat. Such devices, however, have often been structurally complicated, expensive to manufacture, are not versatile, and have not provided optimum arrangements for transmitting and receiving the ultrasonic and electrical signals. For example, U.S. Pat. No. 5,495,680 to Cassem is directed to a relatively complex fish finding device employing sonar fish finding capabilities which may be mounted to a bank. The Cassem device is generally akin to a fishing pole, albeit with no fishing line. The "pole" is mounted to the ground at one end and supports a sonar transducer assembly at its other end. Due to the weight of the sonar transducer assembly, however, the pole is bowed so that its tip extends beneath the surface of the water in order to properly position the sonar transducer. The Cassem device also includes an electrical cable which extends along the pole between the sonar transducer and a display device such that a visual representation of the bottom surface of the body of water and the relative location of objects within the water can be provided. The Cassem system does, however, require a separate fishing pole for fishing, U.S. Pat. No. 5,463,597 to Harlev is directed to a fishing pole having a sonar transducer extending therefrom. The fishing line of the Harlev fishing pole is, in one embodiment, a cable which provides electrical communication between the sonar transducer and a visual display. The sonar transducer of the Harlev fishing pole is mounted within a spherical float in the form of a conventional bobber. Therefore, the electrical cable not only electrically connects the visual display and the sonar transducer, but also serves as the fishing line such that movement of the fishing hook imparts movement to the sonar transducer, thereby disturbing the sonar readings. Thus, if the fishing line of the Harlev device contacts an underwater obstacle or is moved by a fish, the sonar transducer is likewise moved and the received and/or transmitted sonar signals are disturbed. Further, the spherical float has a relatively small surface area which, inherently, does not provide a stable float for the transducer in rough waters since the spherical float will tend to bob about in the water, thereby further disturbing the sonar readings by altering the relative position of the sonar transducer to the surface of the water. Indeed, these prior devices, as exemplified by the above-described patents, fail to provide an effective, efficient and easy manner of using sonar technology for fish finding applications when fishing from a bank or other fixed surface.

SUMMARY OF THE INVENTION

It is therefore an object of the present invention to provide a fishing device having sonar fish finding capabilities and actual fishing capabilities for assisting an angler fishing from a bank or other fixed support.

Another object of the present invention is to provide a fishing device having a lightweight float which does not add substantial weight to the fishing pole and which stabilizes the sonar transducer to maintain uninterrupted contact with the water.

It is a further object of the present invention to provide a buoyant transducer assembly including a sonar transducer supported upon the water surface by an advantageously configured float.

The present invention overcomes the drawbacks and shortcomings associated with the prior devices by providing, in one embodiment, a fishing device having an elongate fishing pole with a fishing line and a flexible electrical cable extending along its length, each of which are adapted to be independently manipulated. The fishing line extends along the pole and into the water for supporting a fishing hook. The flexible electrical cable preferably extends from an output device, such as a visual display, along the elongate fishing pole and an end portion thereof extends beyond the fishing pole and supports a buoyant transducer assembly on the water surface. Accordingly, movement of the fishing line is independent of and does not necessarily impart motion to the electrical cable.

In a second embodiment, the buoyant transducer assembly is used independent of the fishing pole. The disc-like shape of the buoyant transducer assembly facilitates its positioning upon the surface of the water, even at great distances from the shore or bank. For instance, the free end of the cable may be retained by the angler, and the buoyant transducer assembly may be thrown or otherwise placed onto the water surface.

The buoyant transducer assembly of the present invention includes a float and a sonar transducer. The float comprises a hub which, in one embodiment, is centrally located and defines a downwardly opened recess for receiving the sonar transducer and for maintaining an emitting surface thereof in substantial constant contact with the water. Additionally, the float preferably includes at least one and, more preferably, a plurality of buoyant cells, such as a pair of diametrically opposing buoyant cells, to stabilize the float and to ensure that the emitting surface of the sonar transducer remains in a predetermined orientation, such as downward-looking, relative to the surface of the water, even in rough water. In order to further stabilize the transducer assembly and to thereby improve the sonar results, a portion of the float having a surface area greater than the surface area of the emitting surface contacts the water and damps movement of the transducer due to waves or other water movements.

The buoyant cells of the float define handles to assist in handling of the buoyant transducer assembly. Also provided are diametrically opposing recesses substantially defined by the buoyant cells and the central hub which are configured to permit the flexible cable to be wrapped around the transducer assembly for compact storage and carrying. Accordingly, an effective and efficient manner of fishing from a surface, such as a bank, is provided by the buoyant transducer assembly of the present invention which simultaneously possesses sonar fish finding capabilities.

BRIEF DESCRIPTION OF THE DRAWINGS

The foregoing and other objects and advantages of the present invention will be made apparent from the following detailed description of the preferred embodiment of the invention and from the drawings, in which:

FIG. 1 is an environmental, perspective view of the sonar transducer assembly mounted to a fishing pole according to the present invention;

FIG. 2 is an enlarged perspective view of fasteners used to secure the flexible cable of FIG. 1;

FIG. 3 is a top perspective, exploded view of the transducer float with the transducer shown exploded therefrom;

FIG. 4 is an enlarged view of the transducer shown in FIG. 1;

FIG. 5 is a side-elevational view of the transducer of FIG. 1;

FIG. 6 is a side-elevational view of the transducer of FIG. 5 rotated 90°.

FIG. 7 is a bottom perspective, exploded view of the transducer float with the transducer shown exploded therefrom;

DETAILED DESCRIPTION

Figure 8:
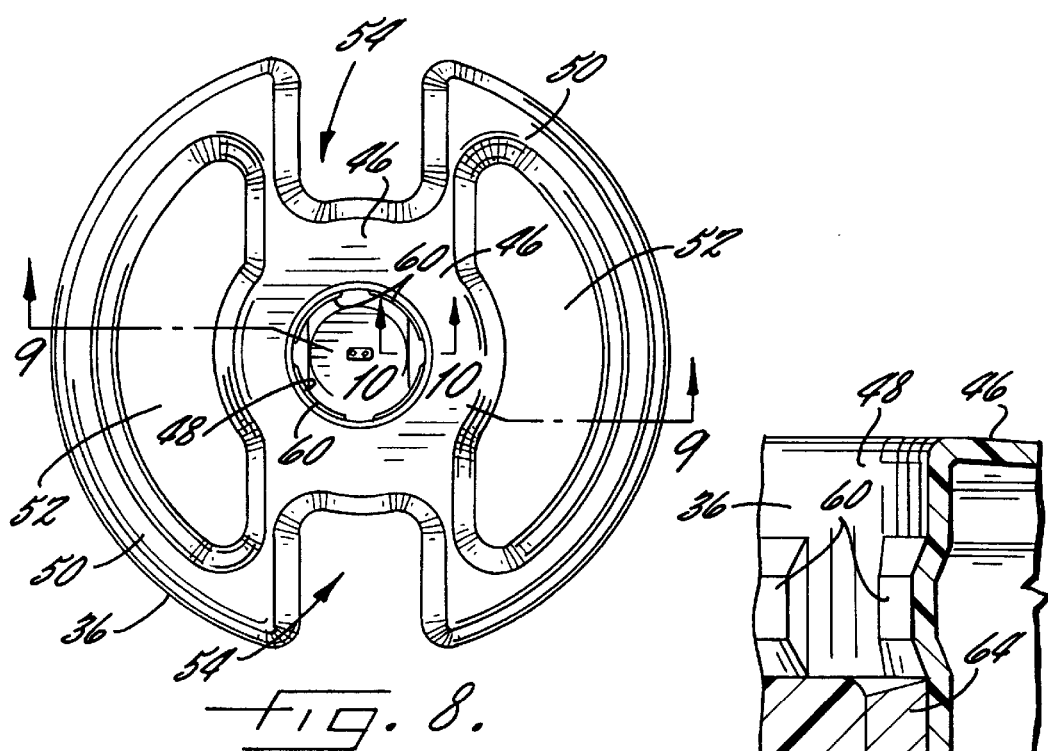
FIG. 8 is a top plan view of the transducer float.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

The fishing device, such as for bank fishing, is shown generally at 10 and includes a buoyant transducer assembly 12 for permitting an angler to utilize a sonar transducer for assistance in locating fish while using a fishing pole 14 and standing on a boat, a dock, a bank or other fixed location as shown in FIG. 1. Of course, the sonar transducer may be used to relay any parameter relating to fishing including the depth of the water. Accordingly, an angler may utilize the sonar transducer assembly of the present invention even when a boat is unavailable or in instances in which the body of water will not permit boat navigation.

The fishing pole 14 is elongate and has a proximal end 16 which may, for instance, be held by the angler for support. Alternatively, the proximal end may be mounted to the ground, such as with an anchor or other means known in the art. The fishing pole 14 also comprises a distal end 18, opposite the proximal end, which may be positioned so as to extend over the body of water. As shown in FIG. 1, the fishing pole 14 of one advantageous embodiment comprises a plurality of incrementally sized segments 20 wherein each succeeding segment 20 may be nested or received within the preceding segment 20 so as to form a telescoping fishing pole. Thus, the fishing pole 14 can be collapsed to a first, retracted position for storing and transporting the fishing device 10. Alternatively, the fishing pole can be opened to a second, extended position for fishing. Of course, it is within the spirit and scope of the present invention to provide a fishing pole having a unitary construction, as is well known in the art.

A flexible fishing line 22 extends from the proximal end 16 of the fishing pole 14 to a first distal location, such as distal location 24 as shown in FIG. 1. The flexible fishing line 22 also comprises a portion which extends or continues beyond the first distal location 24 beneath the surface of the water for supporting a fishing hook 26. As shown in FIG. 1, a bobber 28 can be mounted upon this portion of the fishing line as is conventional in the art. However, it is within the scope of the present invention to utilize the buoyant transducer assembly for bank fishing 10 without a bobber 28.

The fishing device also includes a flexible electrical cable 30 which has a first end in communication with an output device 32, such as a visual display, and a second end which extends along the fishing pole 14 to a second distal location, such as distal location 34 shown in FIG. 1. The second distal location 34 is spaced apart from the first distal location 24 at which the fishing line 22 terminates by a predetermined distance. As shown, the first distal location 24 of the fishing line 22 is beyond the second distal location 34 of the cable, but this relative positional relationship may be reversed, or the two locations 24 and 34 may be the same. In any event, however, the fishing line and the electrical cable can be independently manipulated, that is, the fishing line and the cable can be independently extended and retracted. As also shown, a portion of the cable 30 extends beyond the second distal location 34 and downward so that a second end of the cable is at least adjacent the water surface to support a buoyant transducer assembly 12, as will be discussed in more detail below.

The associated output device 32 is shown to be a visual display, but it is within the spirit and scope of the present invention that the output device includes any means for communicating with the angler and, indeed, other communicating means may be used such as, for example, audio devices, which permit "eyes-free" operation. In the preferred embodiment, however, the visual display 32 includes an internal power source such as a battery. Alternatively, the visual display could include an additional connection (not shown) for connection to an electrical source or an external battery, such an automobile battery.

Accordingly, the angler, shown in phantom in FIG. 1, may move the fishing pole 14 in response to the information communicated by the visual display so that the transducer assembly 12 and the fishing line 22 are properly positioned, i.e., so that the fishing hook is positioned near a school of large fish. If the output device indicates that a particular fishing site is poor, i.e., no fish are located, the angler may reposition the fishing pole 14. Because the flexible cable 30 and fishing line 22 are independently mounted to the fishing pole 14, the cable and the fishing line can be individually manipulated such that movement of either the cable or the fishing line does not necessarily impart movement to the other. For example, should the hook 26 come into contact with an underwater object other than a fish, the fishing line is free to move around or over the object without substantially effecting the position or stability of the buoyant transducer assembly 12.

To position the fishing device 10 for assisting an angler, the angler simply extends the telescoping fishing pole 14 either by pulling the outermost segment 20 or by performing a casting motion to extend the segments 20 to form the elongate fishing pole 14. The angler may then attach portions of the cable 32 at various locations along the length of the fishing pole 14 so that the cable is supported by the pole and does not significantly sag from the pole 14. In a preferred embodiment, various fasteners or ties 38 may be utilized to releasably secure portions of the cable 30 at various locations of the fishing pole 14 as shown in FIGS. 1 and 2. More advantageously, the telescoping fishing pole 14 will be extended one segment 20 at a time and the fasteners 38 positioned on each or selective segments or segment 20. FIG. 2 illustrates two preferred types of fasteners, although any known mechanical connection may be utilized.

The fishing line 22 may be positioned in a conventional manner, i.e., either manually or by reel (if one is provided on the fishing pole), so that the length of the fishing line may be varied depending upon the particular marine environment, such as the depth of the water and the type of fish sought to be caught. Due to the independent relationship of the fishing line to the cable, the length of the fishing line 22 may be varied without affecting the length of the flexible cable 30. If the fishing line and the cable were not capable of independent manipulation and the fishing line 22 were extended, the cable would also be extended and would tend to sag and even accumulate around the buoyant transducer assembly 10, thereby adding unnecessary weight thereto.

Figure 11:
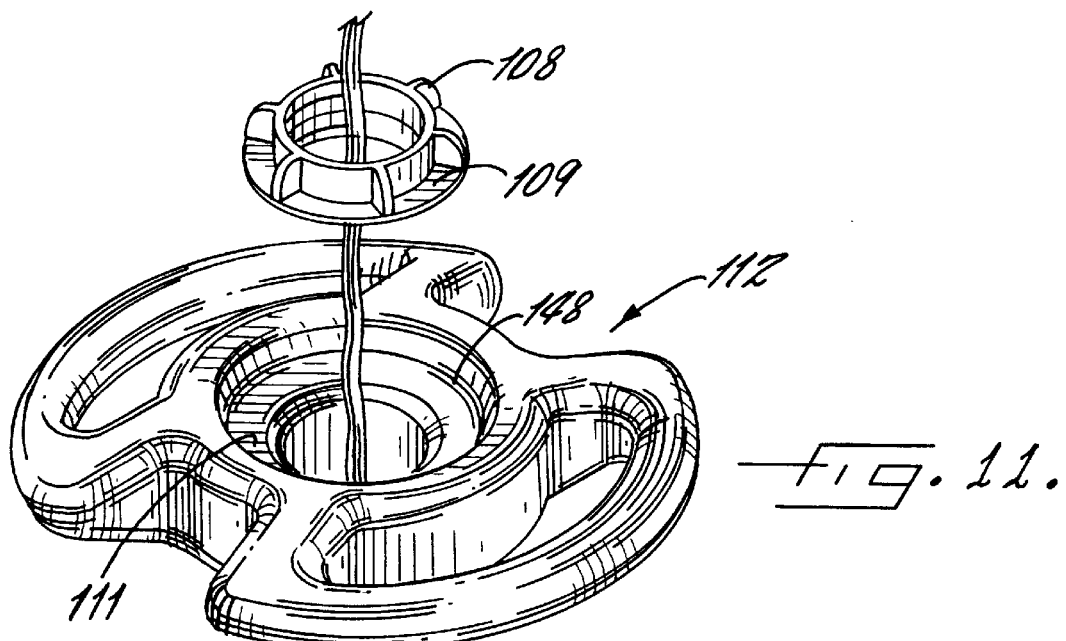
FIG. 11 is an environmental, perspective view of a second embodiment of the sonar transducer according to the present invention.
Figure 12:
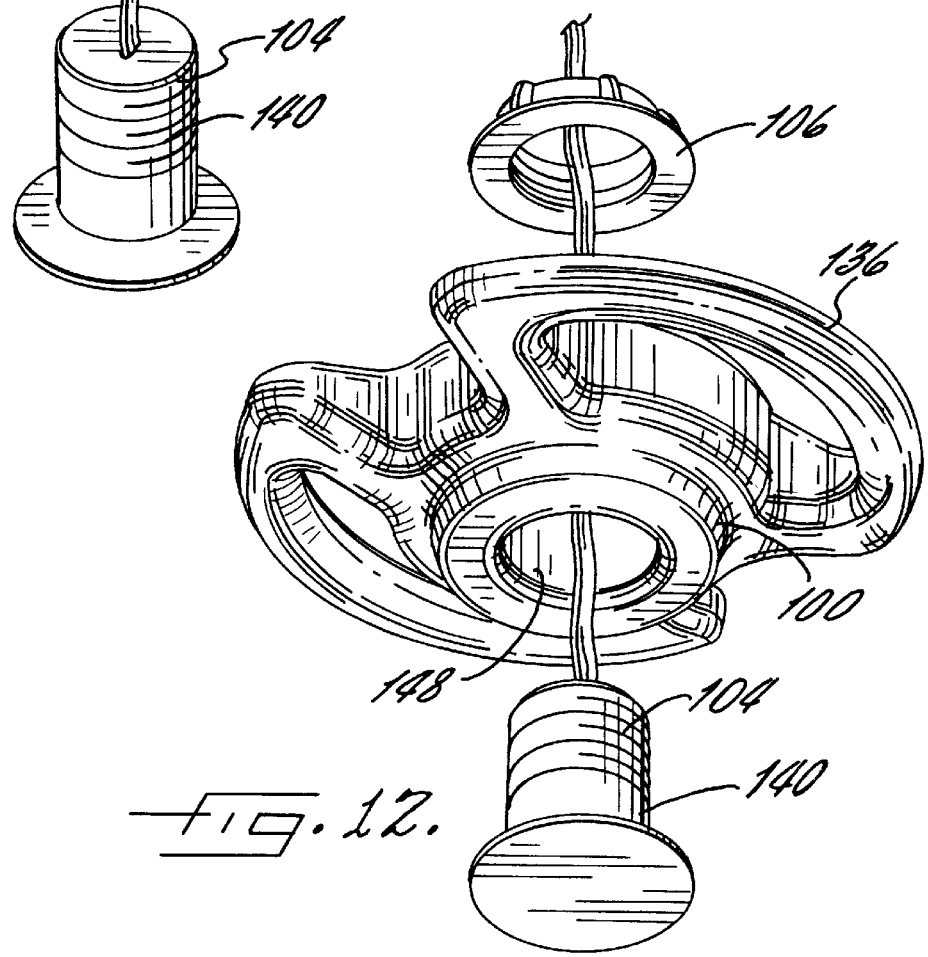
FIG. 12 is an enlarged, cross sectional view taken along line 12—12 of FIG. 11 of the buoyant support of the second embodiment.
Figures 11, 12:
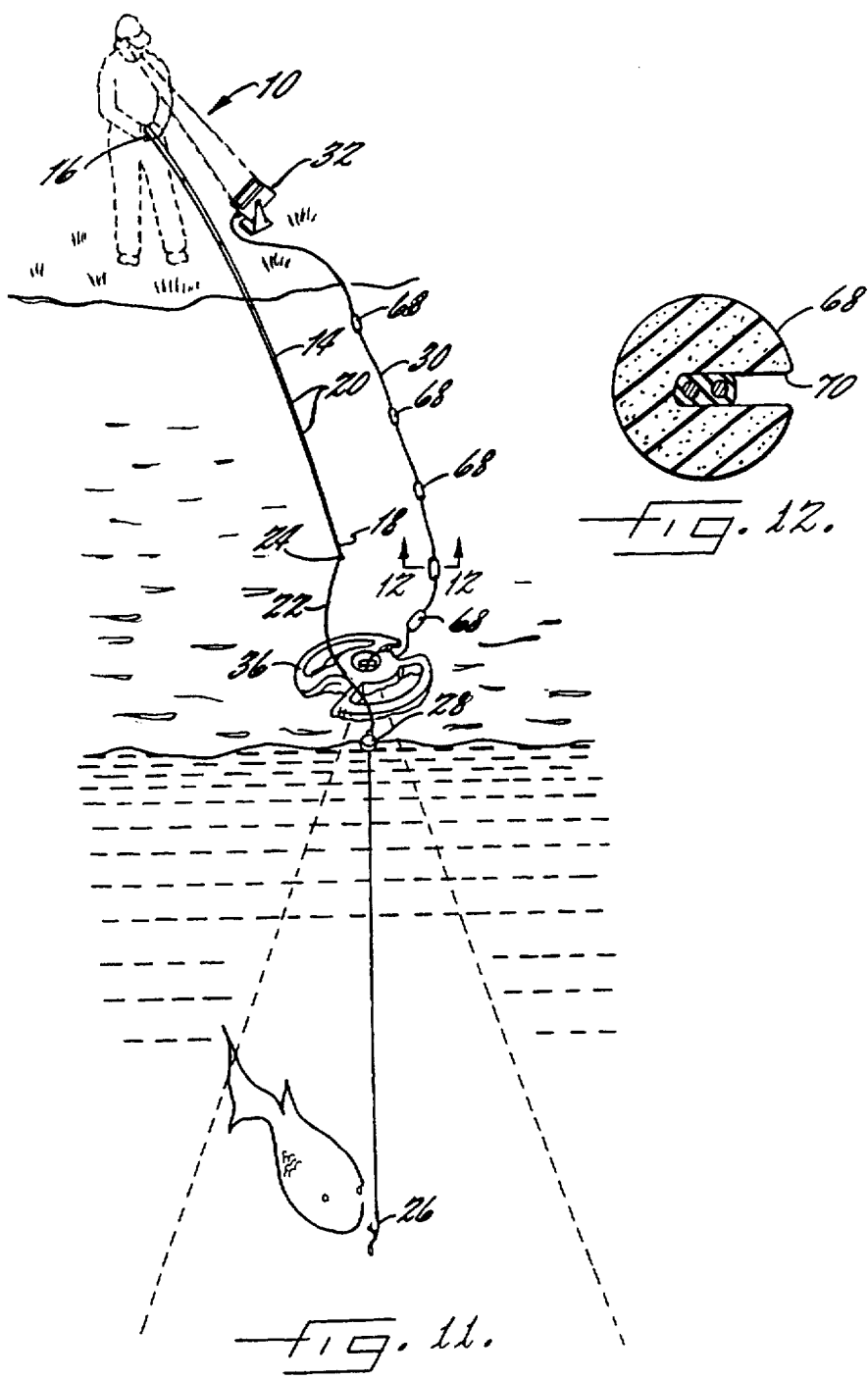

In an alternative embodiment, shown particularly in FIGS. 11 and 12, the fishing pole 14 may be utilized independently of the buoyant transducer assembly 12. For instance, the angler may detach the fasteners 38, if already mounted to the fishing pole 14, and throw or otherwise position the float 36 onto the water surface independent of the fishing pole 14. The ability to throw or otherwise position the float substantial distances in an accurate manner is enhanced by the disc shape of the buoyant transducer assembly 12. In a preferred embodiment, a plurality of buoyant supports 68 may be provided to support the cable 30 upon the water surface. The plurality of buoyant supports 68 are bulbous and formed of a buoyant material such as styrofoam or a closed cell foam. A crevice 70 extends along the length of the upper surface of the support 68 and is of a sufficient depth and configuration to frictionally receive the cable 30. The fishing pole 14 may then be cast and used in the conventional manner to fish in the vicinity of the buoyant transducer assembly 12. Moreover, the fishing pole can be used in situations in which the buoyant sonar transducer assembly 12 is not desired.

Figure 9:
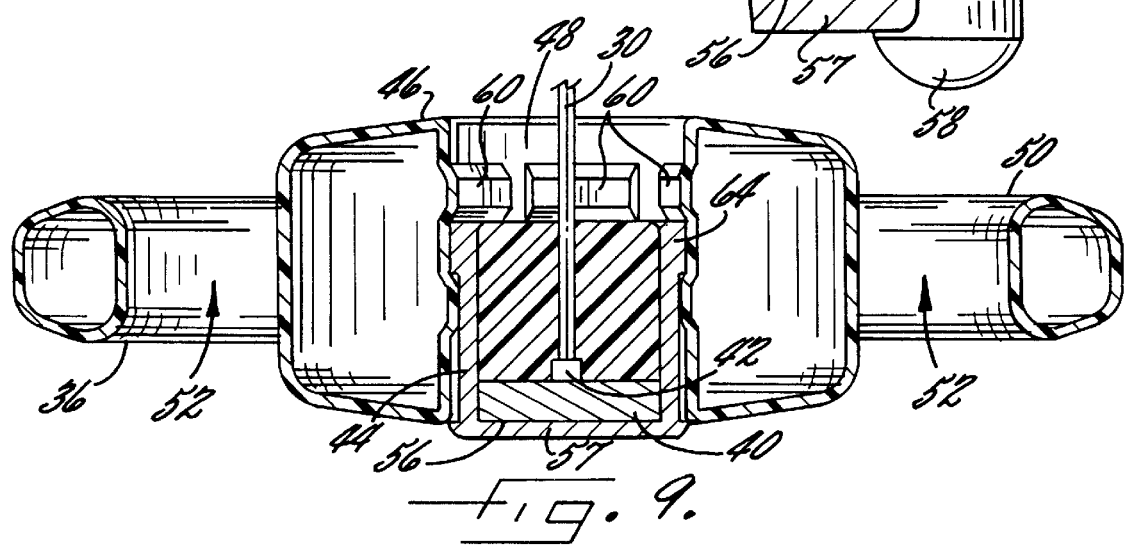
FIG. 9 is a cross-sectional view of the transducer float taken along line 9—9 of FIG. 8.

The buoyant transducer assembly 12 is illustrated in more detail in FIG. 9. As shown, a sonar transducer 40 is housed within a transducer pod or housing 44 and the transducer 40 is connected to the flexible cable 30 by a flexible connection 42 as known in the art. The transducer pod 44 is then filled, for instance, with an epoxy to secure the sonar transducer 40 within the transducer pod 44. In an alternative embodiment, a thru-the-hull transducer assembly (not shown) may be supported by the float 36.

The sonar transducer 40 detects objects within the water, such as the bottom surface of the body of water, fish or other obstacles within the water, by sending an ultrasonic signal from an emitting surface 56 which travels outward from the transducer, such as in a downward direction, until striking an object within the water. Upon striking an object, the ultrasonic signals produce echo signals that bounce back or are reflected to the transducer 40. The transducer receives the echo signals and converts the echo signals to electronic signals indicative of the objects within the water. The electronic signals are thereafter provided to the output device which produces a predetermined type of output, such as visual display of the objects within the water and other parameters relating to fishing such as, for example, the depth of the water and/or the relative location of fish therein.

To ensure constant communication between the output device 32 and the sonar transducer 40, the fishing device must provide a complete circuit so that electrical signals may be transmitted therebetween. As a result, the emitting surface 56 must remain in contact with the water because the water serves as the medium through which the sonar and echo signals travel. Moreover, if the sonar transducer 40 is supported upon the water surface in an unstable manner, the transducer and, more particularly, the emitting surface of the transducer may temporarily lose contact with the water, thereby interrupting the sonar signals. The sonar transducer assembly 12 thereby includes a float 36 to stabilize the sonar transducer 40 and to maintain the transducer in substantially constant contact with the water. The float also maintains the emitting surface 56 of the transducer in a predetermined orientation relative to the water, such as downward looking orientation.

The float 36, as shown particularly in FIGS. 3 and 7–10, is formed of a hollow, buoyant body. The float 36 is formed of a lightweight material which, when formed into a hollow body, has a natural buoyancy to support the transducer 40 and to maintain the emitting surface 56 of the transducer 40 in substantial constant contact with the water. The float 36 may, alternatively, be used to support other instruments (not shown) other that a transducer. In a preferred embodiment, a plastic material formed by injection molding, such a high density polyethylene, is selected to form the hollow body of the float 36. Although the float is shown to be hollow, the float can be filled with a buoyant material, such as styrofoam or a closed cell foam, if so desired.

As shown, the float 36 is substantially disc-shaped so that the surface area of the float which contacts the water is maximized, thereby providing a stable float for the sonar transducer 40. Preferably, the surface area of the float which contacts the water is greater than the surface area of the emitting surface of the transducer. For example, in one advantageous embodiment, the surface area of the float which contacts the water is more than twice as great as the surface area of the emitting surface of the transducer.

In addition, a substantially symmetrical float 36 is most preferred so that natural movement of the water does not affect the ability of the sonar transducer 40 to perform its transmitting and receiving functions. The particular, the float 36, according to the present invention, adapted to float in a predetermined position on the water so that the float 36 will stabilize the transducer 12 and will maintain the emitting surface 56 of the transducer in operative contact with the water. Further, the hollow body design minimizes the weight of the float 36 so that undue weight is not transmitted to the fishing pole 14 through the cable 30. Thus, the fishing pole 14 is substantially free from excess weight from the float 36 and bowing of the fishing pole 14 is avoided. The fishing pole 14 may be thus be used in a manner similar to a conventional fishing pole 14 which does not includes a buoyant transducer assembly 12.

In one advantageous embodiment, the surface area of the float which contacts the water is maximized, while the overall weight of the float is minimized by providing a float 36 having a hub 46 to which the transducer is connected. For example, in one advantageous embodiment discussed in more detail hereinbelow, the hub is centrally disposed and defines a centrally located, downwardly opened recess 48 within which the transducer is disposed. Accordingly, the float of this embodiment is preferably symmetric relative to the downwardly opened recess defined by the hub. The float also preferably includes at least one buoyant cell disposed outwardly from the hub and, more preferably, includes a plurality of buoyant cells 50 which extend radially outward from the central hub 46. This configuration of the float thus provides a support for the sonar transducer 40 which is received within the recess 48.

At least one and, more preferably, each of the buoyant cells 50 of the float 36 preferably define an aperture 52 which forms a handle for transporting the buoyant transducer assembly 12 and for further reducing the weight of the float 36. As shown, the buoyant cells 50 of one preferred embodiment are symmetrically positioned in a diametrically opposed manner. This substantially symmetrical configuration contributes to the stabilization of the float 36 upon the surface of the water. The hub 46 and the buoyant cells 50 define recesses 54 which are also on diametrically opposing sides of the float 36. The recesses 54 are configured to receive a flexible strand, such as the electrical cable 30, which may be wound or wrapped about the central hub 46 and through the opposed recesses when the device is not being used. The handles 52 facilitate the wrapping of the cable 30 around the float 36 and through the recesses. By wrapping the cable about the float, the float can be stored in a compact manner and can be conveniently transported.

The transducer pod 44 comprises a cover 57 which is transparent to ultrasonic signals so as to not interfere with the transmission and receipt by the ultrasonic signals of the sonar transducer 40 housed therein. When the transducer pod 44 is positioned within the recess defined by the hub 46, the cover 57 extends over the emitting surface of the sonar transducer and beneath the surface of the central hub 46 so that the cover is submerged within the water when the transducer assembly is in operation. By remaining submerged, sonar signals can be continually transmitted and received in a reliable fashion as described above. Since the cover of the transducer pod extends over the emitting surface of the sonar transducer and is transparent with respect to ultrasonic signals, the emitting surface is effectively or operatively placed in contact with the water by placing the cover of the transducer pod in contact with the water.

In order to protect the transducer pod and the sonar transducer housing therein, the float also preferably includes a number of angularly displaced legs 58 protruding from the bottom surface of the float 36 in a circular arrangement about the downwardly opened recess defined by the central hub. As such, if the transducer assembly is placed on a hard surface, or is accidently dropped, the legs 58 will protect the fragile emitting surface 56 of the transducer 40 from inadvertent damage.

The float also preferably includes a plurality of angularly displaced, arcuate protrusions 60 extending inwardly into the recess defined by the central hub 48 as shown in the various figures. Although any number of protrusions 60 may be provided, the float of the illustrated embodiment includes an upper set of four protrusions and a lower set of four protrusions which extend into the recess of the central hub 46. These protrusions cooperate with corresponding recessed portions of the transducer pod 44 (described below) to frictionally receive the transducer pod 44 and to support the transducer pod within the float 36.

Figure 10:
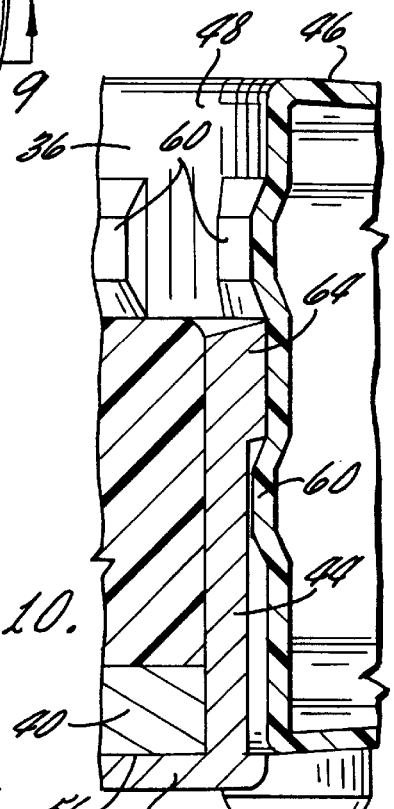
FIG. 10 is a cross-sectional view of a portion of the transducer float taken at line 10—10 of FIG. 8.

The friction fit between the float and the transducer pod is further facilitated by the configuration of the transducer pod 44. The transducer pod 44 has a substantially cylindrical sidewall 62 which includes outwardly extending protrusions 64. The outwardly extending protrusions 64 are configured to cooperate with the protrusions 60 of the float 36 as shown particularly in FIGS. 9 and 10. As illustrated, the outwardly extending protrusions 64 are positioned between adjacent sets of inwardly extending protrusions 60 of the central hub 46. Thus, a transducer pod 44 may be manually placed within the recess 48 with force sufficient to deform the protrusions 60 of the float 36. In this regard, the transducer pod 44 may be inserted from either the top or the bottom of the float. To stabilize the transducer pod 44 within the aperture 54, the float also includes a bottom flange 66 which cooperates with the bottom edge of the central aperture 54 as also shown in FIGS. 9 and 10.

Use of the fishing device 10, according to the present invention, thereby permits an angler to use a conventional fishing pole 14 and to attach the buoyant transducer assembly 12 thereto. The angler may thus take advantage of sonar technology even when not fishing from a boat or when not fishing in a large or easily navigable body of water. To employ the present invention, the angler need only carry an output device, such as the visual display 32, the buoyant transducer assembly 12 having the cable 30 stored neatly therearound, and a fishing pole 14, such as a telescoping pole, to the desired body of water. If a telescoping fishing pole 14 is used, the angler need only connect the cable 30 having the transducer pod 44 attached thereto to the visual display 32 and then attach the cable 30 along select segments 20 of the fishing pole 14 as the segments 20 are successively extended. Fasteners 38 may then be used to secure the cable 30 at intervals along the length of the fishing pole 14.

The angler may then, either manually or with use of a reel, extend the fishing line 22 so that the line extends an appropriate distance beyond or beneath the fishing pole 14 so that hook 26 supported thereon is properly positioned. The angler may then begin fishing by positioning the fishing pole 14 over the water so as to place the buoyant transducer assembly on the surface of the water and to drop the fishing hook into the water. Based upon the output provided by the visual display, the operator can determine the optimum fishing site, typically based upon the concentration of fish, in order to improve the angler's chances of catching a fish.

Once the angler feels a bite or sees the bobber 28 (if one is provided) sink, the angler may set the hook and bring the fish to shore in a conventional manner. In an alternative embodiment, not shown, a support for the fishing pole 14 having wheels may be provided wherein the pole 14 may be wheeled rearwardly to bring the fish to shore.

While particular embodiments of the invention have been described, it will be understood, of course, that the invention is not limited thereto since modifications may be made by those skilled in the art, particularly in light of the foregoing teachings. It is therefore, contemplated by the appended claims to cover any such modifications that incorporate those features of these improvements in the true spirit and scope of the invention.

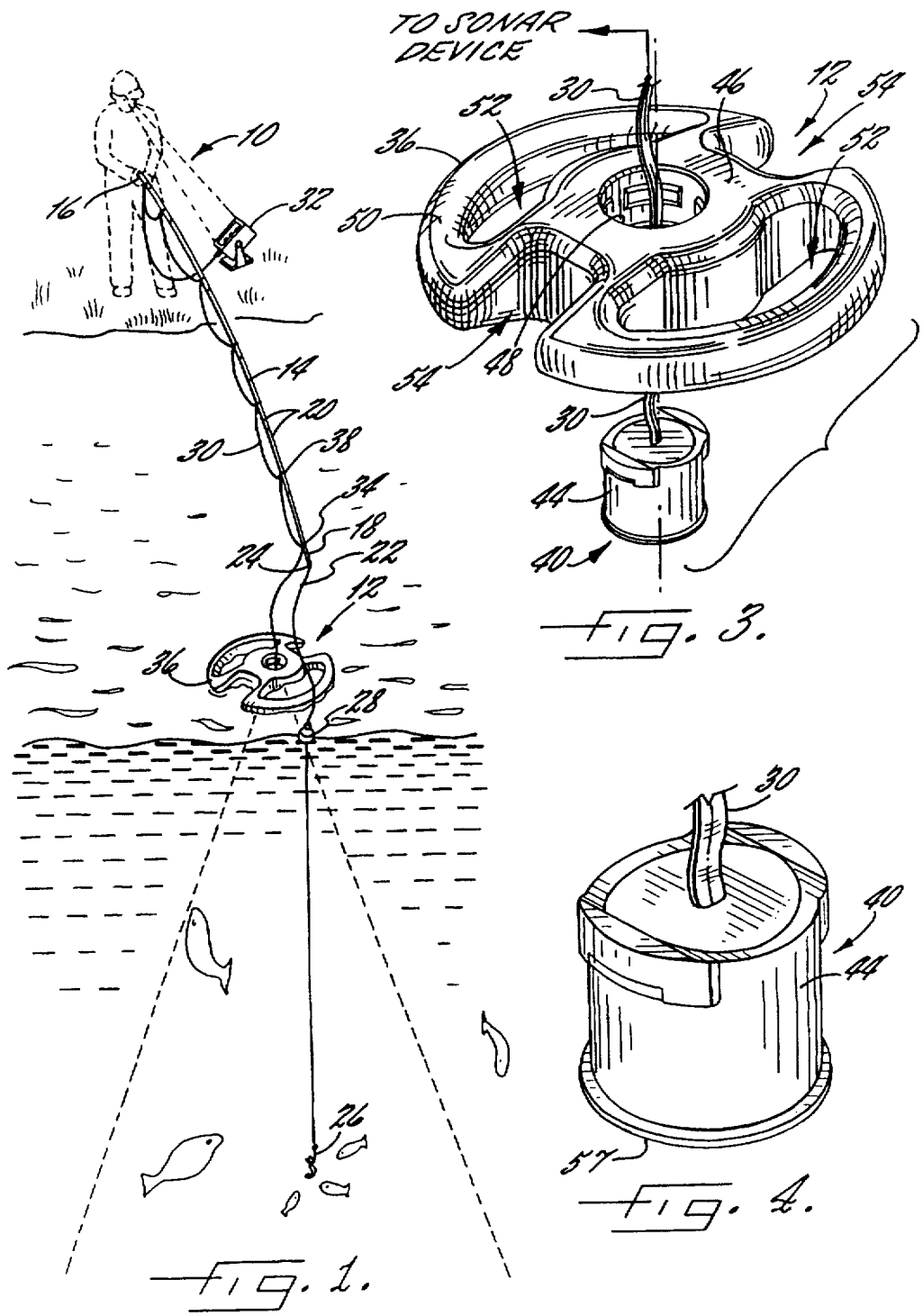

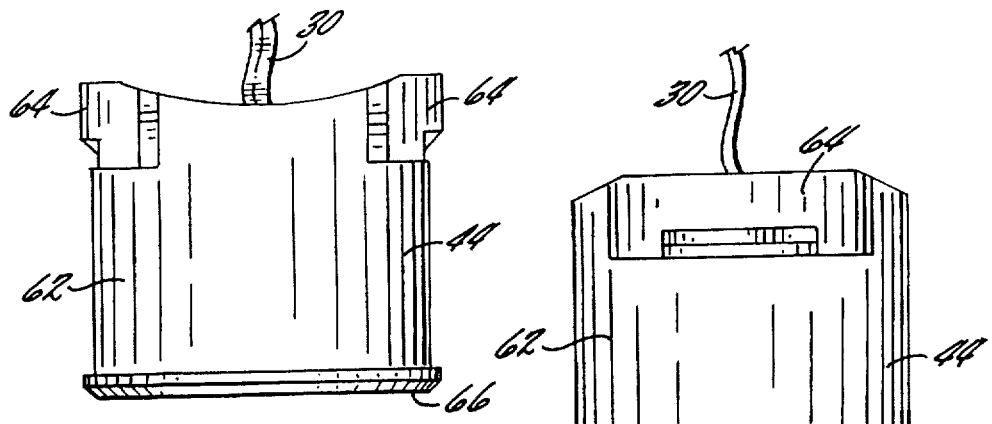
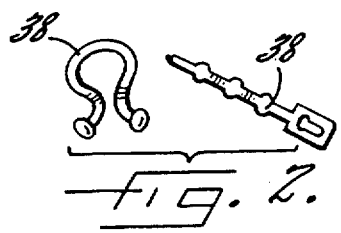
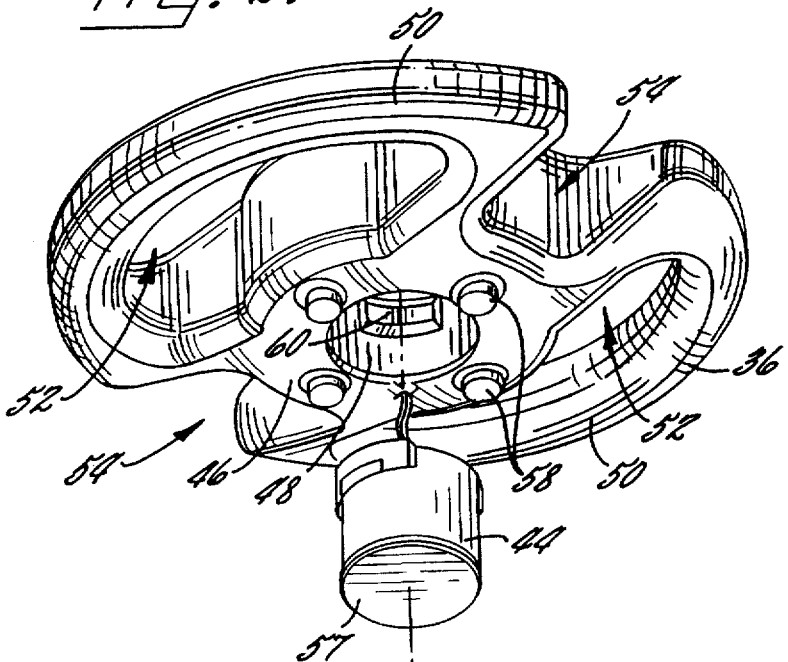

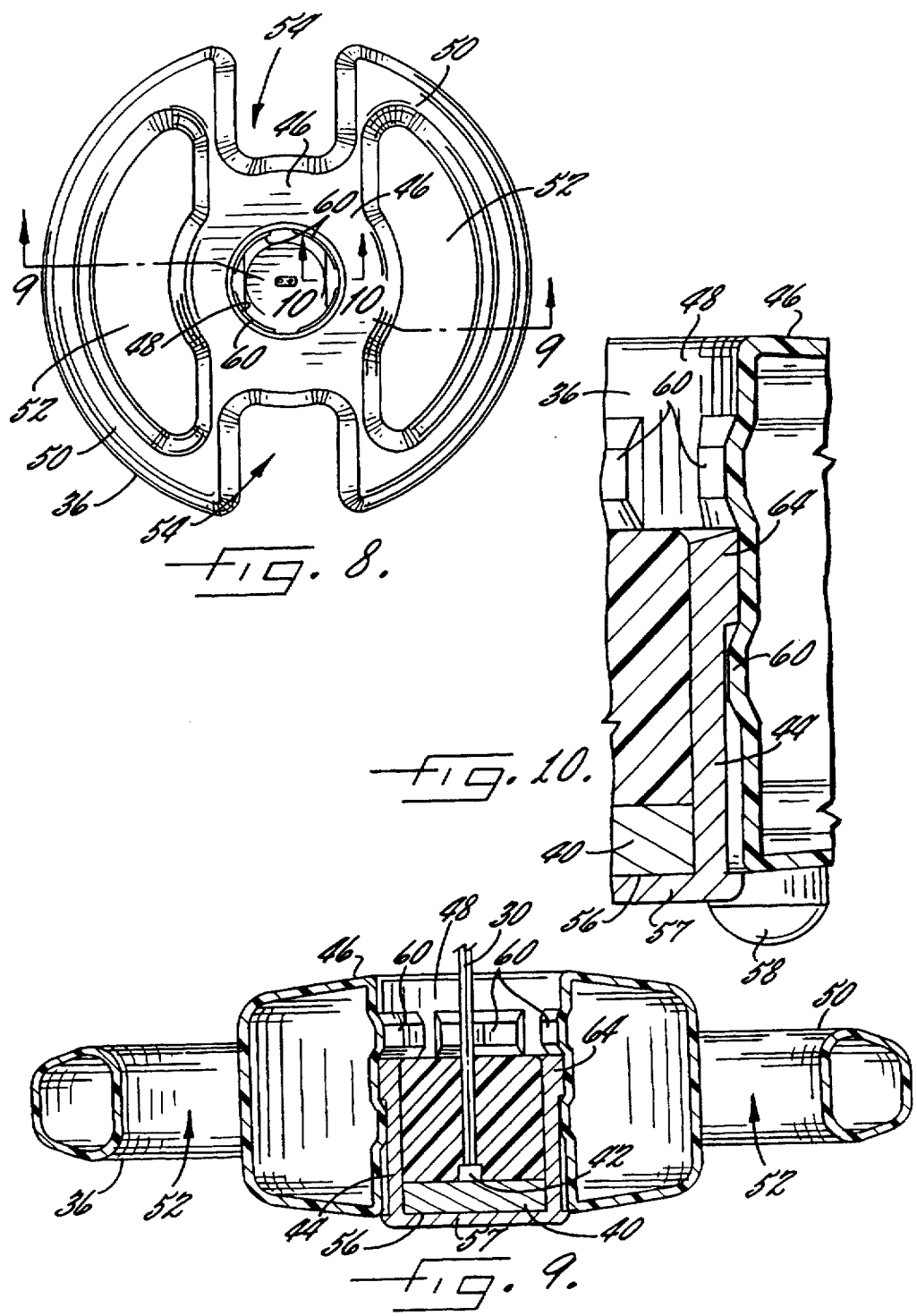

We claim:

1. A fishing device for assisting an angler by detecting objects within a body of water, said device comprising:
   an elongate fishing pole having opposed proximal and distal ends;
   a flexible fishing line extending along said pole from said proximal end to a first distal location, said fishing line continuing beyond said first distal location so as to extend beneath the surface of the water to an end portion for supporting a fishing hook;
   a flexible cable adapted to be manipulated independent of said fishing line and having a first end in communication with an output device for providing indicia relating to objects detected within the water, said cable extending from the output device and along said fishing pole to a second distal location which is spaced apart by a predetermined distance from said first distal location, said cable continuing beyond said second distal location so that a second end of said cable is at least adjacent the water surface;
   a float positioned on said second end of said cable; and
   a sonar transducer, supported by said float and operably connected to said cable, for providing signals indicative of objects within the water, said float having a predetermined surface area and a predetermined weight which stabilizes said transducer such that said transducer consistently provides signals indicative of objects within the water.

2. A fishing device according to claim 1 wherein the output device is a visual display.

3. A fishing device according to claim 1 wherein said fishing pole comprises a plurality of incrementally-sized segments which are nested to form a telescoping fishing pole having a first, retracted position for storing and transporting the fishing device and a second, extended position for fishing.

4. A fishing device according to claim 1 further comprising at least one fastener for fastening said cable to said fishing pole.

5. A fishing device according to claim 1 wherein said float comprises a hub defining a downwardly opened recess and at least one buoyant cell disposed outwardly from said hub, and wherein said transducer has an emitting surface and is disposed within said downwardly opened recess defined by said hub such that said emitting surface is submerged within the water so as to transmit sonar signals through the water and to receive echo signals reflected from objects within or beneath the water.

6. A fishing device according to claim 5 wherein said at least one buoyant cell defines an aperture which forms a handle for transporting said float and for reducing the weight thereof.

7. A fishing device according to claim 5 wherein said hub and said at least one buoyant cell define at least one recess configured to receive a portion of said flexible cable wrapped about said float.

8. A fishing device for assisting an angler by detecting objects within a body of water, said device comprising:
   an elongate fishing pole having opposed proximal and distal ends;
   a fishing line extending along said pole and having a distal portion which extends downwardly from said fishing pole and into the water for supporting a fishing hook;
   a cable extending along said fishing pole and having a distal portion which extends downwardly from said fishing pole so as to be positioned adjacent the water surface, wherein said cable is adapted to be manipulated independent of said fishing line; and
   a buoyant transducer assembly having a transducer for transmitting sonar signals through the water and for receiving echo signals reflected from objects within or beneath the water and a float for supporting said transducer, said buoyant transducer assembly positioned on said distal portion of said cable so that said transducer at least operably contacts the water surface.

9. A fishing device according to claim 8 wherein said float comprises a hub defining a downwardly opened recess and at least one buoyant cell disposed outwardly from said hub, and wherein said transducer has an emitting surface and is disposed within said downwardly opened recess defined by said hub such that said emitting surface is submerged within the water so as to transmit sonar signals through the water and to receive echo signals reflected from objects within or beneath the water.

10. A fishing device according to claim 9 wherein said at least one buoyant cell defines an aperture which forms a handle for transporting said assembly and for reducing the weight thereof.

11. A fishing device according to claim 9 wherein said hub and said at least one buoyant cell define at least one recess configured to receive a portion of a flexible strand wrapped about said buoyant transducer assembly.

12. A fishing device according to claim 8 wherein said buoyant transducer assembly further comprises a float having a buoyant body to support said buoyant transducer assembly upon the surface of the water, wherein said transducer comprises an emitting surface having a first surface area, and wherein said transducer is connected to said buoyant body such that said emitting surface is submerged within water so as to transmit sonar signals through the water and to receive echo signals reflected form objects within or beneath the water.

13. A fishing device according to claim 12 wherein said buoyant body defines a downwardly opened recess within which said transducer is disposed, and wherein said buoyant body is substantially symmetrical relative to said downwardly opened recess.

14. A fishing device according to claim 12 wherein said buoyant body floats upon the water such that a predetermined portion of said buoyant body having a second surface area contacts the water, and wherein the second surface area is greater than said first surface area such that said float stabilizes said transducer and maintains said emitting surface of said transducer in operative contact with the water.

15. A fishing device according to claim 8 wherein said fishing pole comprises a plurality of incrementally-sized segments which are nested to form a telescoping fishing pole having a first, retracted position for storing and transporting the fishing device and a second, extended position for fishing.

16. A fishing device according to claim 8 further comprising at least one fastener for fastening said cable to said fishing pole.

17. A buoyant transducer assembly for transmitting and receiving sonar signals within water, said assembly comprising:
a float comprising a hub defining a downwardly opened recess and at least one buoyant cell disposed outwardly from said hub and cooperating therewith to support said float on a surface of the water; and
a transducer having an emitting surface, said transducer disposed within said downwardly opened recess defined by said hub such that said emitting surface is submerged within the water so as to transmit sonar signals through the water and to receive echo signals reflected from objects within or beneath the water.

18. A buoyant transducer assembly according to claim 17 wherein said hub is centrally disposed and wherein said at least one buoyant cell extends radially outward from said central hub.

19. A buoyant transducer assembly according to claim 18 wherein at least one buoyant cell defines an aperture which forms a handle for transporting said assembly and for reducing the weight thereof.

20. A buoyant transducer assembly according to claim 18 wherein said central hub and said plurality of buoyant cells define at least one recess configured to receive a portion of a flexible strand wrapped about the buoyant transducer assembly.

21. A buoyant transducer assembly according to claim 17 wherein said hub comprises a plurality of angularly displaced protrusions which extend axially inward within said downwardly opened recess and which are configured to frictionally engage said transducer.

22. A buoyant transducer assembly according to claim 21 further comprising a transducer pod for housing said transducer, wherein said transducer pod is disposed within said downwardly opened recess for supporting the transducer therein, and wherein said transducer pod has a substantially cylindrical sidewall configured to cooperate with said protrusions of said hub to provide a friction fit therebetween.

23. A buoyant transducer assembly according to claim 22 wherein said transducer pod also has a cover which extends over said emitting surface of said transducer and which protrudes beyond a bottom surface of said float such that said emitting surface of said transducer remains submerged within the water.

24. A buoyant transducer assembly according to claim 23 wherein said hub includes a plurality of legs extending outwardly from the bottom surface to protect said emitting surface of said transducer.

25. A buoyant transducer assembly according to claim 17 wherein said float is hollow and floats upon the water such that a predetermined portion of said float having a first surface area contacts the water.

26. A buoyant transducer assembly according to claim 25 wherein the emitting surface of said transducer has a second surface area, and wherein the first surface area is substantially greater than the second surface area such that said float stabilizes the transducer.

27. A buoyant transducer assembly according to claim 17 further comprising a flexible cable associated with said transducer for transferring information related to the sonar signals received by said transducer.

28. A buoyant transducer assembly according to claim 27 further comprising at least one buoyant support configured to receive a portion of said cable therein to support said cable upon the surface of the water.

29. A buoyant transducer assembly for transmitting and receiving sonar signals, said assembly comprising:
a float comprising a substantially symmetrical buoyant body; and
a transducer having an emitting surface having a first surface area, said transducer connected to said buoyant body and disposed such that said emitting surface is submerged within water so as to transmit sonar signals through the water and to receive echo signals reflected from objects within or beneath the water, wherein said buoyant body floats upon the water such that a predetermined portion of said buoyant body having a second surface area contacts the water, and wherein the second surface area is greater than the first surface area such that said float stabilizes said transducer and maintains said emitting surface of said transducer in operative contact with the water.

30. A buoyant transducer assembly according to claim 29 wherein said buoyant body comprises a hub and at least one buoyant cell disposed outwardly from said hub, and wherein said at least one buoyant cell defines an aperture which forms a handle for transporting said assembly and for reducing the weight thereof.

31. A buoyant transducer assembly according to claim 29 wherein said buoyant body comprises a hub and at least one buoyant cell disposed outwardly from said hub, and wherein said hub and said at least one buoyant cell define at least one recess configured to receive a portion of a flexible strand wrapped about the buoyant transducer assembly.

32. A buoyant transducer assembly according to claim 29 wherein said buoyant body defines a downwardly opened recess within which said transducer is disposed, and wherein said buoyant body comprises a plurality of angularly displaced protrusions which extend axially inward within said downwardly opened recess and which are configured to frictionally engage said transducer.

33. A buoyant transducer assembly according to claim 29 further comprising a flexible cable associated with said transducer for transferring information related to the sonar signals received by said transducer and at least one buoyant support configured to receive a portion of said cable therein to support said cable upon the surface of the water.

* * * * *

UNITED STATES PATENT AND TRADEMARK OFFICE
CERTIFICATE OF CORRECTION

PATENT NO. : 5,771,205
DATED : June 23, 1998
INVENTOR(S) : Jon David Currier, et al.

It is certified that error appears in the above-identified patent and that said Letters Patent is hereby corrected as shown below:

TITLE PAGE:
In the References Cited, U.S. PATENT DOCUMENTS, add the following missing references:

```
    Des. 259,699   6/81    Hughes
    2,605,721      8/52    Johnson et al.
    2,661,704      12/53   Johnson
    4,400,856      8/83    Tseng
    5,070,805      12/91   Plante
```

IN THE DRAWINGS

The sheets of drawings, consisting of figures 1-12 should be deleted to appear as per attached figures 1-12.

Signed and Sealed this

Twenty-fourth Day of November, 1998

Attest:

BRUCE LEHMAN

Attesting Officer

Commissioner of Patents and Trademarks